United States Patent
Negoi

(10) Patent No.: US 7,605,641 B2
(45) Date of Patent: Oct. 20, 2009

(54) APPARATUS COMPRISING A CHARGE PUMP AND LCD DRIVER COMPRISING SUCH AN APPARATUS

(75) Inventor: Andy Negoi, Crolles (FR)

(73) Assignee: NXP B.V., Eindhoven (NL)

( * ) Notice: Subject to any disclaimer, the term of this patent is extended or adjusted under 35 U.S.C. 154(b) by 79 days.

(21) Appl. No.: 11/572,916

(22) PCT Filed: Jul. 26, 2005

(86) PCT No.: PCT/IB2005/052510

§ 371 (c)(1),
(2), (4) Date: Jan. 29, 2007

(87) PCT Pub. No.: WO2006/013538

PCT Pub. Date: Feb. 9, 2006

(65) Prior Publication Data

US 2008/0100233 A1 May 1, 2008

(30) Foreign Application Priority Data

Jul. 29, 2004 (GB) ................................. 0416881.1

(51) Int. Cl.
*G05F 1/10* (2006.01)

(52) U.S. Cl. ........................ 327/538; 327/536; 327/157; 327/59

(58) Field of Classification Search .................. 327/538, 327/536, 157, 59
See application file for complete search history.

(56) References Cited

U.S. PATENT DOCUMENTS

2003/0067429 A1 4/2003 Aoki et al.
2005/0254271 A1* 11/2005 Negoi .......................... 363/59

FOREIGN PATENT DOCUMENTS

EP WO03090332 A 10/2003

* cited by examiner

*Primary Examiner*—Tuyet Vo

(57) ABSTRACT

Apparatus comprising a charge pump (20) with multiple independently regulated outputs (V1, V2) for providing different voltage levels at each of said outputs. The charge pump (20) comprises a low voltage input (12), on/off regulation (30), and at least two charge stages (11, 21) which are arranged in a cascaded manner. Each charge stage (11, 21) comprises a stage capacitor (16, 26), a switch (S1, S3), and a buffer (15, 25) for pumping a bottom plate of the stage capacitor (16, 26).

14 Claims, 3 Drawing Sheets

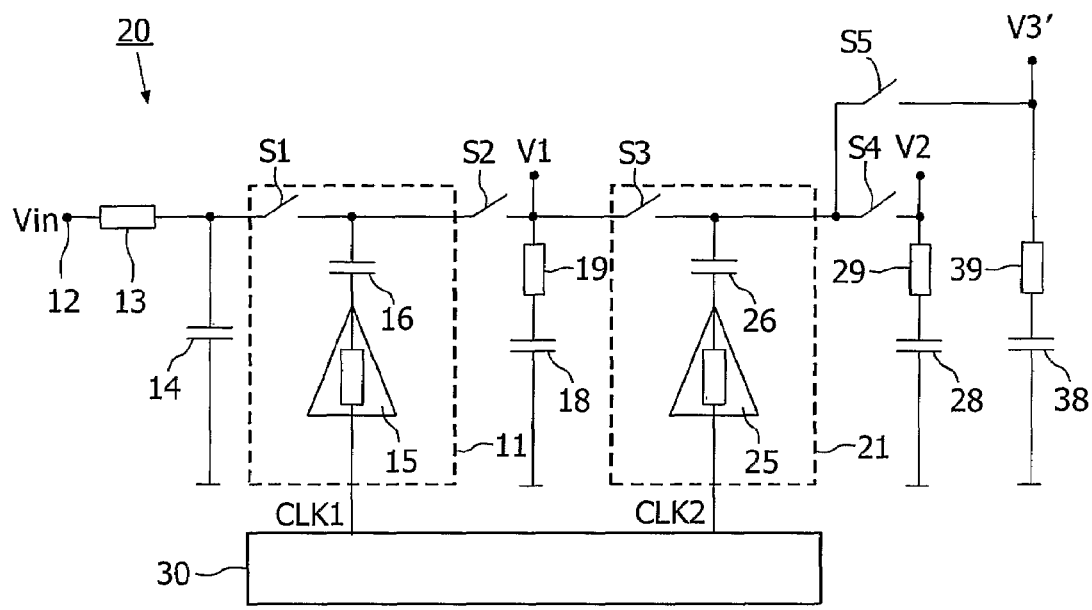
FIG. 3A
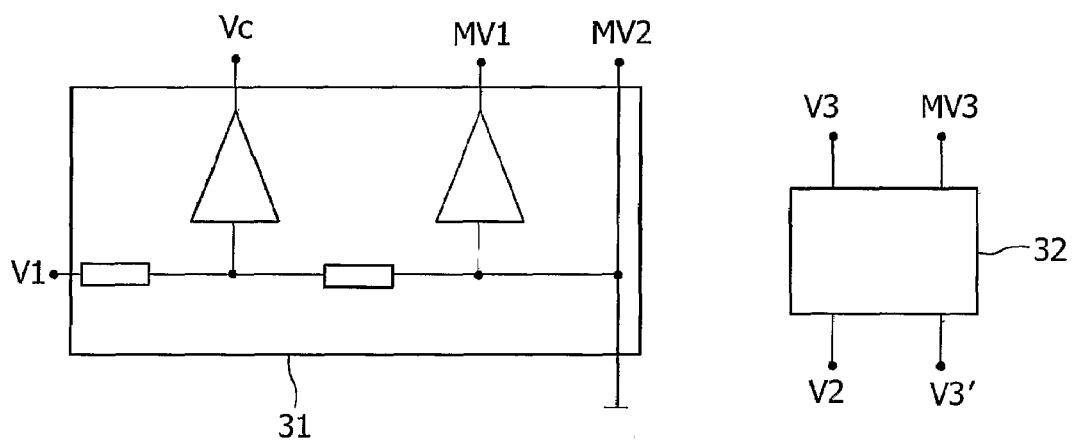
FIG. 3B
FIG. 3C

APPARATUS COMPRISING A CHARGE PUMP AND LCD DRIVER COMPRISING SUCH AN APPARATUS

FIELD OF THE INVENTION

The present invention concerns charge pumps and systems, such as LCD drivers, based thereon.

BACKGROUND OF THE INVENTION

Charge pumps are used to generate a higher voltage than the supply voltages available for an application. For example, in a Liquid Crystal Display (LCD) driver, a charge pump is used to generate the bias voltages required by the driving schemes.

In the LCD driving integrated circuits (ICs), the trend is nowadays for manufacturers to develop ever higher resolution and color displays for mobile terminals (phones, PDAs, etc.). These displays need a large current at a voltage approaching 20V, which has to be generated by the LCD driving IC. Charge pumps are used, with on-chip capacitors or with external capacitors, in order to achieve this voltage.

A characteristic of modern driving schemes for passive liquid crystal displays (LCDs) is that several DC voltage levels are switched to supply the rows and columns of a matrix of pixels (assimilated with capacitors). LCD driving ICs implementing these driving schemes have, due to the switching, a current consumption that is not negligible.

Every voltage level of (for example 7 different voltages) necessary to drive an LCD using the Multiple Row Addressing (MRA) scheme (with 4 rows selected at a time) would see a different current consumption. Depending on the pattern displayed on the LCD panel, the loads of the different voltage levels can become very unbalanced (sometimes with a factor of 10). Because of this highly random load distribution, it is very difficult to develop a bias level generator which is optimal. With a capacitive voltage booster for instance, it is known that the higher a voltage is needed, the higher would be the current consumption.

Recent developments propose a solution that is not yet optimal. This solution is based on pumping in a first step to a pump output level that is about half of the highest voltage, supplying the voltage levels which are lower than this pump output level, then using a voltage doubler to supply the rest of the higher voltage levels.

A charge pump with several charge stages being arranged in series are disclosed in the published US patent application US 2002/0114199 A1. A required multiplication factor is adjustable by activating/deactivating a number of stages.

The known approaches for providing a set of voltage levels are not satisfying if the load is unbalanced, for instance.

It is thus an object of the present invention to provide a solution that takes into account the characteristics of the current load It is a further objective of the present invention to improve conventional charge pumps and to provide charge pumps having a reduced current consumption.

It is a further objective of the present invention to improve conventional LCD drivers and to reduce their current consumption.

SUMMARY OF THE INVENTION

These disadvantages of known systems, as described above, are reduced or removed with the invention as described and claimed herein.

An apparatus in accordance with the present invention is claimed in claim 1. Various advantageous embodiments are claimed in claims 2 through 7.

An LCD Driver in accordance with the present invention is claimed in claim 8. An advantageous LCD Driver is claimed in claim 9.

According to the present invention, each of the heaviest loaded levels is supplied by an individual output of a corresponding capacitive charge pump.

The invention describes how to generate, with a single charge pump comprising several charge stages, multiple voltage levels required to drive a LCD, each of the voltage levels being regulated to have a precise value.

In a preferred embodiment of the invention the voltage levels are programmable.

Mainly, the invention has been developed to use on-chip stage capacitors for the charge pump and external, large value buffer capacitors in order to minimize the ripple of the outputs, but it is not limited to this embodiment. A charge pump may use also external stage capacitors instead of the on-chip stage capacitors. It is also possible to employ a combination of on-chip an external capacitors.

The invention is particularly well suited for any application requiring to supply several voltage levels, higher or lower than the input (supply) voltage, where each level is loaded differently in current.

Additional features and advantages of the invention will be set forth in the description that follows, and in part will be apparent from the description.

BRIEF DESCRIPTION OF THE DRAWINGS

For a more complete description of the present invention and for further objects and advantages thereof, reference is made to the following description, taken in conjunction with the accompanying drawings, in which:

FIG. 3A shows a schematic block diagram of a second apparatus, according to the present invention;

FIG. 3B shows a schematic block diagram of a circuit that can be used in connection with an apparatus, according to the present invention;

FIG. 3C shows a schematic block diagram of another circuit that can be used in connection with an apparatus, according to the present invention;

DESCRIPTION OF PREFERRED EMBODIMENTS

Before addressing detailed embodiments of the present invention, the typical block diagram of a LCD system 10 is addressed.

Figure 1:
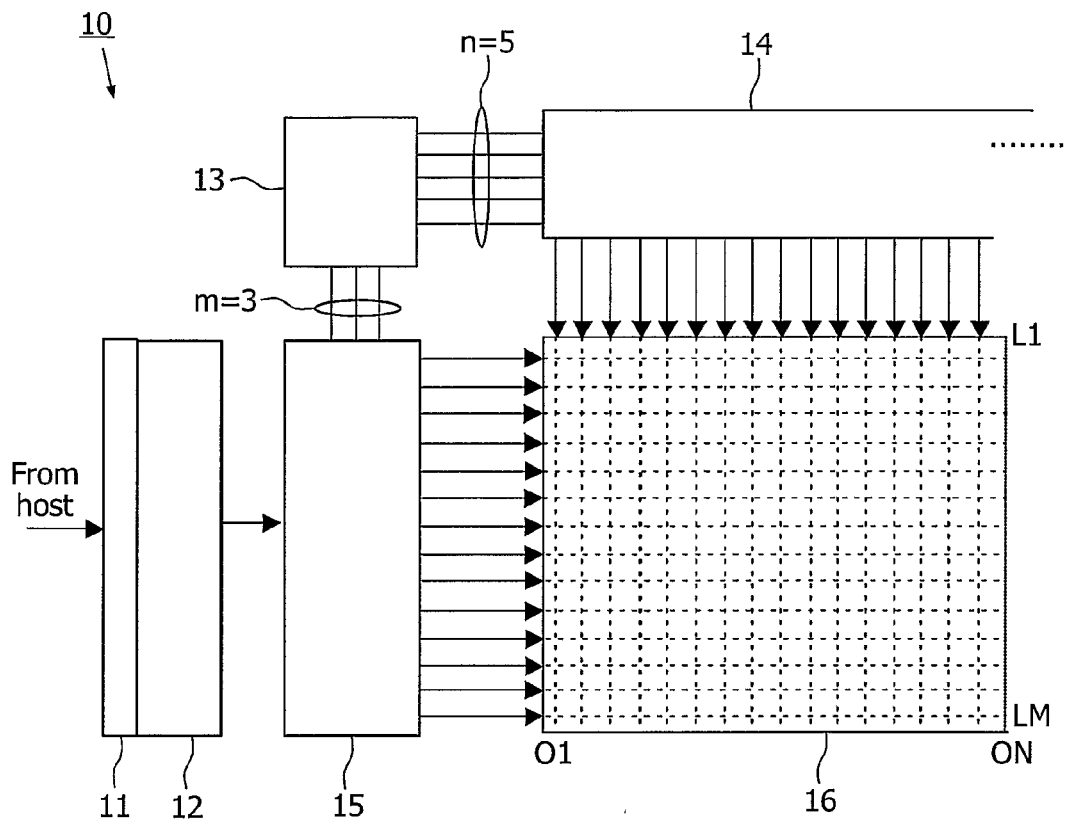
FIG. 1 shows a schematic block diagram of a LCD displays comprising an apparatus, according to the present invention.

FIG. 1 shows a typical block diagram of a LCD system 10. A serial or a parallel interface is used as the interface between a host computer (not illustrated in FIG. 1) and a display module. A serial interface function 11 is typically integrated into a display timing controller 12. There is a column driver bank 14 driving the columns of a LCD display 16. The column driver bank 14 comprises a plurality of column drivers. Typically, each source driver of the column driver bank 14 serves n column electrodes (with n=288=96 RGB or 396=132 RGB, for example) of the display panel 16 by providing analog output signals (for example the 5 levels V2, V1, VC, MV1 and MV2). In the present example, each column driver serves one column electrode only. There is a row driver array 15 comprising an array of row drivers. In the most current application, a group of p=4 rows are driven during four consecutive time slots with the DC voltages V3 and MV3, all the rest of the rows being connected to VC. During the next four time slots, the following consecutive four rows are addressed qith the levels V3 and MV3. Each pixel of the display 16 is a capacitor between a row and a column electrode. The display 16 may be a passive matrix LCD panel with 132RGB columns and 176 rows, for example.

There is an apparatus 13 that provides in the present example a set of m+n=7 different voltage levels (there are 7 levels, because VC is common to rows and columns). In the embodiment of FIG. 1, three voltages (m=3) are used for driving the rows via the gate driver array 15 and five voltages (n=5) are used for driving the columns via the source driver array 14.

A charge pump, according to the present invention, may be located inside the apparatus 13. According to the present invention, this charge pump has multiple regulated outputs in order to fit the best with the degree of current load of each of the m+n=7 individual bias levels.

Figure 2:
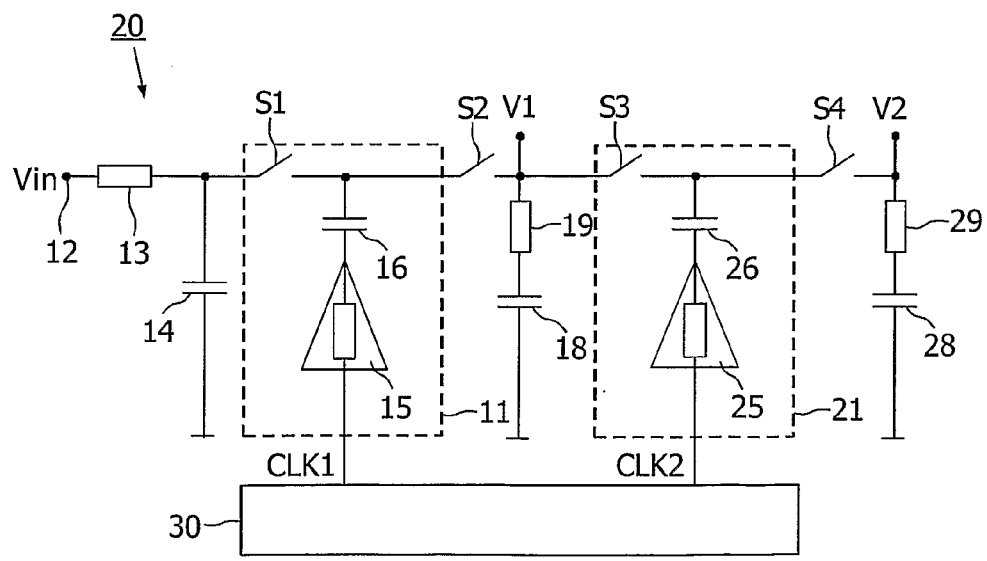
FIG. 2 shows a schematic block diagram of a first apparatus, according to the present invention.

FIG. 2 presents the most basic schematic of a charge pump 20, comprising two cascaded stages 11, 21, according to the present invention. As illustrated in FIG. 2, the charge pump 20 comprises multiple independently regulated output nodes V1 and V2. Different voltage levels V1, V2 are provided at each of said outputs. The charge pump 20 comprises a low voltage DC input Vin 12, an on/off regulation 30, and at least two charge stages 11, 21 being arranged in a cascaded manner. Each charge stage 11, 21 comprises a stage capacitor Cstage 16, 26, an input switch S1, S3, preferably a MOS switch, and a buffer 15, 25 for pumping a bottom plate of the stage capacitor 16, 26. Each of the buffers 15, 25 has a clock input for receiving a clock signal CLK1, CLK2 from the on/off regulation 30. In the present embodiment, there are additional elements employed, namely a contact resistor Rcon 13 at the input side and an input capacitor 14. The input capacitor 14 is employed to compensate a voltage drop at the contact resistor Rcon 13.

Each output V1, V2 has an output resistor 19, 29, an output capacitor 18, 28 arranged in series and an output switch S2, S4. Using these output switches S2, S4, the two output voltages V1, V2 can be switched off.

The switches S1, S3 and S2, S4 are controlled by digital signals, which are correlated to the clocks CLK1 and CLK2, respectively. The condition is that S1 and S2 are not conductive at the same time (and the same applies for S3 and S4), i.e. they are conductive in complementary phases. An example of command sequence for a pumping stage (say 11) is: phase 1, CLK=0, S2 is open and S1 is closed, then the phase 2: S1 open, CLK=1, S2 conductive. When the stage is disabled, then the clock remains in the phase 1 and the. output V1 and the capacitor 18 are not pumped anymore.

The charge pump 20 works as follows. A DC voltage Vin is applied to the low voltage input 12. As long as the desired output voltage V1 is not reached at the output V1, the on/off regulation 30 continues to supply the clock signal CLK1 to the buffer 15 of the first stage 11 and the buffer 15 pumps charge into the stage capacitor 16. As soon as the desired output voltage V1 is reached, the on/off regulation 30 turns the clock signal CLK1 off and the pumping stops. The voltage V1 is available at the respective output designated with V1.

The very same voltage V1 is also used to charge the stage capacitor 26 of the subsequent charge stage 21, as long as the clock signal CLK2 is applied by the on/off regulation 30 and if the input switch S3 is closed. The first charge stage 11 provides the input voltage V1 for the next charge stage 21, since the charge stages 11, 21 are arranged in a cascaded manner. The different output voltages V1, and V2 can be expressed as follows:

V1=a Vin
V2=b Vin with a and b being integer numbers. These equations are only valid if there is no load attached to these outputs and if the outputs are not on/off-regulated. If the on/off regulation works, a and b are not necessarily integer numbers.

It is an advantage of the charge pump 20, according to the present invention, that each stage 11, 21 can be turned on or off by means of the individual input switches S1, S3. Due to the fact that an on/off regulation 30 is provided, the charging of the stage capacitors 16, 26 is controllable. It is another advantage of the charge pump 20, that each output V1, V2, can provide a high current without having an impact on the respective voltages.

FIG. 3A presents another schematic, comprising two cascaded stages 11, 21, according to the present invention. As illustrated in FIG. 3A, the charge pump 20 comprises multiple independently regulated outputs V1, V2 and V3'. Different voltage levels V1, V2, V3' are provided at each of said outputs. The same reference numbers are used as in connection with FIG. 2.

The charge pump 20 comprises a low voltage DC input Vin 12, an on/off regulation 30, and at least two charge stages 11, 21 being arranged in a cascaded manner. Each charge stage 11, 21 comprises a stage capacitor Cstage 16, 26, an input switch S1, S3, preferably a MOS switch, and a buffer 15, 25 for pumping a bottom plate of the stage capacitor 16, 26. Each of the buffers 15, 25 has a clock input for receiving a clock signal CLK1, CLK2 from the on/off regulation 30. In the present embodiment, there are additional elements employed, namely a contact resistor Rcon 13 at the input side and an input capacitor 14. Each output V1, V2, V3' has an output resistor 19, 29, 39 and an output capacitor 18, 28, 38 arranged in series. In addition to the voltages V1 and V2, a third voltage level is provided at an output V3'. This voltage V3' is generated by applying the electric potential of the top plate of the capacitor 26across the output capacitor 38 and the output resistor 39. The voltages V2 and V3' are both provided by one and the same charge stage 21.

The switches S1, S3 and S2, S4 are controlled by digital signals, which are correlated to the clocks CLK1 and CLK2, respectively. The condition is that S1 and S2 are not conductive at the same time (and the same applies for S3 and S4), i.e. they are conductive in complementary phases. An example of command sequence for a pumping stage (say 11) is: phase 1, CLK=0, S2 is open and S1 is closed, then the phase 2: S1 open, CLK=1, S2 conductive. When the stage is disabled, then the clock remains in the phase 1 and the output V1 and the capacitor 18 are not pumped anymore.

In the present embodiment, the second stage 21 provides the two voltages V2 and V3'. That is, the second charge stage 21 is employed to charge two tanks, namely the capacitors 28, 38. As a consequence, the input switch S3 can be used to switch off both voltages V2 and V3' together. The different output voltages V1, V2, and V3' can be expressed as follows:

V1=a Vin
V2=b Vin
V3'=c Vin with a, b, and c being integer numbers. These equations are only valid if there is no load attached to these outputs and if the outputs are not on/off—regulated. If the on/off regulation works, a, b and c are not necessarily integer numbers.

The apparatus of FIG. 3A may be modified by adding circuits 31 and/or 32, as illustrated in FIGS. 3B and 3C. The heaviest loaded level V1 is generated with a single charge stage 11 (a doubler). MOS transistors serve as switches S1-S5. The V1 voltage level is regulated and is in the present embodiment lower than 2*Vin. However, this first charge pump 11 might multiply more than two times the input voltage Vin in other embodiments.

The voltage level V1, kept stable by the buffer capacitor 18, can further be used to generate the lower voltage levels Vc and MV1 for driving the LCD, if one uses the circuit 31, for example. The voltage V1 forms further the input of the second cascaded charge pump 21 with two outputs, each at different voltage and with different current load, V2 and V3'. For driving the LCD, the V3' is added to V2 and is also mirrored with regard to ground to form the MV3 level. This can be done using a voltage mirror 32 as depicted in FIG. 3C. For example, the voltage levels are like this: V3=11V, V2=6V, V1=4.5V, Vc=3V, MV1=1.5V, MV2=0V, MV3=−5V, Vin=2.6V and V3'=5V. The two outputs of the second charge pump 21 are also regulated with an on/off scheme by digital control of the two output switches S4 and S5, filling the buffer capacitors 28, 38 each until the required charge is achieved. These capacitors 28, 38 will also act as voltage sources.

The efficiency in this embodiment is also very good: one stage adding Vin to V1 would be sufficient to get from the V1 level both the V2 and V3' (in the present embodiment, V1=4.5V, V2=6V and V3'=5V). Thus only two charge stages 11, 21 are sufficient to obtain all the bias levels required to drive the LCD.

Conventional solutions require for this purpose three capacitors (one doubler and one separated tripler). This translates either into area saving (capacitor area in modern submicron processes is expensive) or, for the same area, the capacitors can be larger by a factor 1.5, which improves the maximum current that can be obtained at the outputs. The power efficiency is also improved because of fewer switching events (fewer charge stages).

Figure 4:
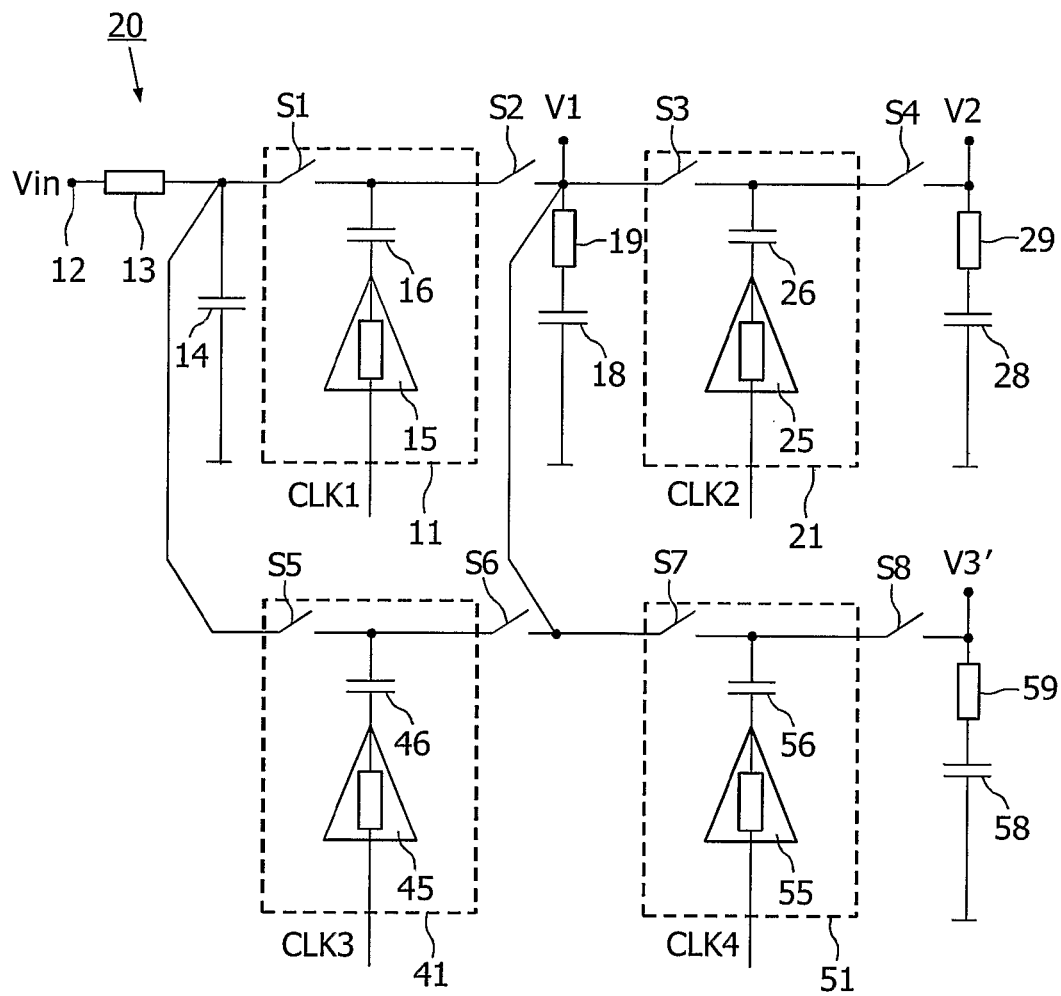
FIG. 4 shows a schematic block diagram of a third apparatus, according to the present invention.

A further embodiment is depicted in FIG. 4. As illustrated in the FIG. 4, the first charge stage 11 can be doubled by adding another charge stage 41. This charge stage 41 is arranged in parallel with respect to the charge stage 11. The charge pump 20 uses two phases: in the first phase, the stage capacitor 16 is filled with charge from the input 12 and the load is disconnected (the charge is kept in the buffer capacitor 18), and in the second phase the stage capacitor 16 is disconnected from the input 12 and pumped ("lifted up") to 2 times Vin via the bottom plate driver 15, allowing the charge, via the output switch S2, to be thrown into the buffer capacitor 18. A second stage 41, as mentioned, can be put in parallel on the opposite phase (the push-pull principle). The two stage capacitors 16, 46 are filled in sequence from Vin, each one on one phase. The same might apply also to the second charge pump 21, or, as in the FIG. 4, the V2 and V3' might be supplied with two different stages 21, 51, the first charge stage 21 operating during the first phase and the second charge stage 51 operating during the second phase. Depending on the load conditions, V2 and V3' might be generated as previously explained in connection with FIG. 3A. Please note that in FIG. 4 the following condition applies: CLK1=NOT CLK3 and CLK2=NOT CLK4. That is, the phase of the signal CLK1 is phase shifted with respect to the signal CLK3 and the signal CLK2 is phase shifted with respect to the signal CLK4.

The apparatus 20 of FIG. 4 may be modified by adding circuits 31 and/or 32, as depicted in FIGS. 3B and 3C.

Figure 5:
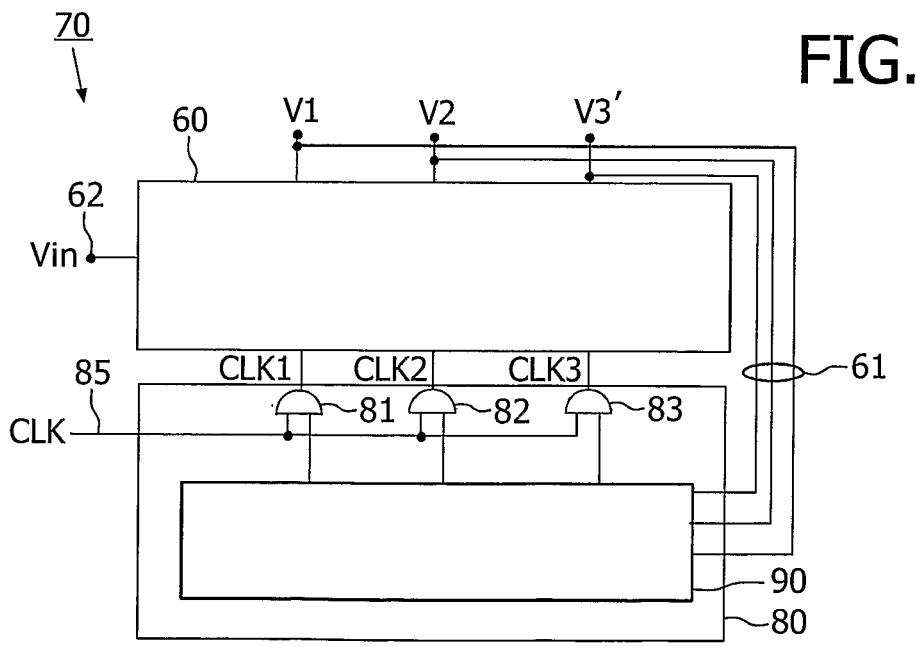
FIG. 5 shows a schematic block diagram of a fourth apparatus, according to the present invention.

A further embodiment is depicted in FIG. 5. The apparatus 70 comprises a charge pump 60 and an on/off regulation 80. The charge pump 60 has a DC voltage input 62 and three outputs V1, V2 and V3'. The voltages at these outputs are fed via reference lines 61 to the on/off regulation 80, as illustrated in FIG. 5. These reference lines 61 are employed in order to enable the on/off regulation 80 to compare the actual voltage levels at the three outputs V1, V2 and V3' with reference voltages. The on/off regulation 80 may comprise a circuit 90 that compares the actual voltages provided via the reference lines 61 with corresponding reference voltages. The circuit 90 may for instance comprise a resistor chain to ground in order to compare the voltages received via reference lines 61 with internal reference voltages. As long as the actual voltage V1 has not yet reached a corresponding reference voltage V1ref, a signal (e.g., a logic "1") is applied by the circuit 90 to an input of an AND-gate 81. A common clock signal CLK is applied to the other input of the AND-Gate 81. This AND-gate 81 issues an output signal CLK1 that is similar to the common clock signal CLK as long as the signal is a logic "1". As soon as the circuit 90 determines that the voltage V1 has reached the reference voltage V1ref, the signal is changed (it becomes a logic "0", for example) and the AND-gate 81 blocks the output and the output signal CLK1 is no longer available. Due to this, the respective charge stage of the charge pump 60 stops pumping and the voltage level V1 is kept stable. The same principle applies to the other voltages. Each voltage is individually monitored by the circuit 90 and the on/off regulation 80 enables or disables the pumping of the corresponding charge stage by switching the clock signals CLK2, CLK3 on or off.

Please note the in the present embodiment the three clock signal CLK1', CLK2, CLK3 have the same frequency, since they are derived from the common clock signal CLK. It is, however, also possible to employ different clock signals for the various charge stages of the charge pump 60.

In the present embodiment, there are three AND-gates 81, 82, and 83 that receive a common clock signal CLK. It is also possible to employ other logic elements to allow the pumping of the individual charge stages to be switched on and off, as needed.

Another advantage of the inventive architecture is that all the voltage levels can be generated with a single software configurable charge pump. The currents are delivered from the same charge pump at different voltages, and depending on the pattern displayed on the LCD panel, one level might be more used (more loaded) than another.

In average, V1 and MV1 are the most loaded, followed by V3 and MV3 and then V2 and MV2. But there are patterns in which V1 and MV1 are almost unloaded and all the current has to be delivered to V2, V3, MV2 and MV3. In this case, a single charge pump as described in this invention is much more flexible, since it can be configured to deliver current where and when it is needed. In the conventional architectures, the doubler would be almost unused in this situation and the tripler would be heavily loaded.

Yet another advantage of the inventive architecture is that depending on the loads and required voltages, the parts of the charge pump might comprise each more than one charge stage (for example, V1 could be supplied with a tripler and V2 and V3' with two additional pumping stages). For a particular load the charge pump configured as a tripler might be a more optimal solution in terms of efficiency.

In yet another embodiment not being depicted in any of the Figures, a doubler or tripler circuit is employed to obtain additional voltage levels. Such a doubler or trippler can be fed by the voltages provided at the outputs of the inventive charge stages. With these additional circuits one can easily obtain further voltage levels.

As described above, an apparatus according to the present invention employs a plurality of cascaded charge stages that constitute separately regulated charge pumps. This arrangement has several advantages. The most evident is that fewer capacitors are required for the same strength of driving. In the FIGS. 2, 3, and 4, all circuitry is on a single chip (e.g., a display driver IC) except the connection resistances Rcon and the buffer capacitors 18, 28, 38. These buffer capacitors 18, 28, 38 are external capacitors being large enough to keep the voltage levels constant and to behave close to an ideal voltage source.

Simulations have revealed that the invention works perfectly, and the efficiency if compared with a conventional doubler and tripler is exactly the same for the same parts values and a typical load condition.

Of course, the efficiency of a charge pump depends on how many charge stages are active, because every switching event consumes some energy to charge and discharge parasitic capacitors. The output voltages are to some extent dependent on the actual current load. When the current is consumed at a high voltage, the current consumption from the input is the output current plus the switching current multiplied by the number of charge stages. The number of charge stages is thus preferably kept at a minimum under condition that for the given load the necessary voltage can be achieved.

As a conclusion, the proposed architecture having a charge pump with multiple independent regulated outputs, besides the saving in stage (and internal capacitors) count, will be also more efficient because fewer switching events occur (and fewer parasitic elements are present). The flexibility of regulation of individual levels is unaffected: the stage capacitors are smaller than the buffer capacitors of each voltage level and on/off regulation is in the easiest way done in the digital domain.

The proposed architecture brings a major advantage in the sense that the stage capacitors can be integrated on chip even in sub-micron technologies (minimum count and small value). But even in the case of external stage capacitors, the present invention helps to reduce the capacitors count to a minimum.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable subcombination.

In the drawings and specification there has been set forth preferred embodiments of the invention and, although specific terms are used, the description thus given uses terminology in a generic and descriptive sense only and not for purposes of limitation.

The invention claimed is:

1. Apparatus comprising:
a charge pump with multiple independently regulated outputs for providing different voltage levels at each of said outputs, said charge pump comprising a low voltage input, and on/off regulation, and at least two charge stages being arranged in a cascaded manner, each charge stage comprising:
a stage capacitor,
a switch,
a buffer for pumping a bottom plate of the stage capacitor, and
a capacitor being arranged between an output node and ground.

2. The apparatus of claim 1, wherein an additional charge stage is arranged in parallel to a first one of said charge stages, said additional charge stage operating on a different phase than the first one of said charge stages.

3. The apparatus of claim 2, wherein additional voltage levels are provided by further cascaded charge pump stages.

4. The apparatus of claim 1, wherein at least one of the stage capacitors is integrated on the same chip as the charge pump.

5. The apparatus of claim 1, wherein the charge pump has a low output resistance.

6. The apparatus of claim 1, being capable of driving at each of said outputs different current loads.

7. The apparatus of claim 1, wherein the on/off regulation comprises logic gates and means for comparing the actual voltage levels provided at said regulated outputs with reference voltages.

8. An LCD Driver comprising an apparatus according to claim 1.

9. The LCD Driver of claim 8 employing a Multiple Row Addressing scheme for passive greyscale or colour liquid crystal displays.

10. The apparatus of claim 1, wherein additional voltage levels are provided by further cascaded charge pump stages.

11. The apparatus of claim 1, wherein additional voltage levels are provided by additional circuits.

12. The apparatus of claim 2, wherein additional voltage levels are provided by additional circuits.

13. The apparatus of claim 2 being capable of driving at each of said outputs different current loads.

14. The apparatus of claim 3 being capable of driving at each of said outputs different current loads.

* * * * *